United States Patent
Aubrey et al.

(10) Patent No.: US 9,050,920 B2
(45) Date of Patent: Jun. 9, 2015

(54) LOWERABLE TRAILER

(76) Inventors: Bradley Aubrey, Oak Hills, CA (US); Carlos Agrusa, Victorville, CA (US)

( * ) Notice: Subject to any disclaimer, the term of this patent is extended or adjusted under 35 U.S.C. 154(b) by 699 days.

(21) Appl. No.: 13/428,856

(22) Filed: Mar. 23, 2012

(65) Prior Publication Data

US 2012/0183380 A1   Jul. 19, 2012

Related U.S. Application Data (63) Continuation-in-part of application No. 12/796,419, filed on Jun. 8, 2010, now abandoned.

(51) Int. Cl.
*B60P 1/02* (2006.01)

(52) U.S. Cl.
CPC ..................................... *B60P 1/027* (2013.01)

(58) Field of Classification Search
CPC ................................ B60P 1/025; B60P 1/027
USPC ................ 414/471, 481, 484, 495; 280/43.18
See application file for complete search history.

(56) References Cited

U.S. PATENT DOCUMENTS

| | | | |
|---|---|---|---|
| 2,230,014 A | 1/1941 | Raven | |
| 2,774,606 A | 12/1956 | Burweger et al. | |
| 2,806,710 A | 9/1957 | Mascaro | |
| 2,957,593 A | 10/1960 | Evans | |
| 3,113,686 A | 12/1963 | Sundin | |
| 3,767,071 A | 10/1973 | Harbers | |
| 3,866,935 A | 2/1975 | Nelson | |
| 4,077,643 A | 3/1978 | Bates | |
| 4,318,656 A * | 3/1982 | Ezell | 414/471 |
| 4,619,578 A | 10/1986 | Routledge | |
| 4,806,065 A | 2/1989 | Holt | |
| 5,308,213 A | 5/1994 | Gilbertson | |
| 5,433,578 A | 7/1995 | Honan, Jr. | |
| 5,474,416 A | 12/1995 | Rogge et al. | |
| 5,536,131 A | 7/1996 | Behr | |
| 5,597,174 A | 1/1997 | Christenson et al. | |
| 5,810,544 A | 9/1998 | Wellman | |
| 5,887,880 A | 3/1999 | Mullican et al. | |
| 6,068,276 A | 5/2000 | Kallstrom | |
| 6,349,952 B1 | 2/2002 | Kallstrom | |
| 6,592,139 B1 | 7/2003 | Shanahan | |
| 6,857,643 B2 * | 2/2005 | Neider | 280/43.18 |
| 7,243,979 B1 | 7/2007 | Stene et al. | |
| 7,618,227 B2 | 11/2009 | Smith | |
| 8,016,316 B1 | 9/2011 | Carlton | |
| 2004/0184903 A1 | 9/2004 | Neider | |

* cited by examiner

*Primary Examiner* — Jonathan Snelting
(74) *Attorney, Agent, or Firm* — Kirk A. Buhler; Buhler & Associates (57) ABSTRACT

Improvements in a lowerable trailer that uses pneumatic cushions to provide both the cushioning of the trailer bed and raising and lower of the trailer bed. The air in the pneumatic cushions can be vented to allow the bed of the trailer to lay flat on the ground. Another pneumatic cushion changes the angle of the bed to the tongue to ensure that both the front and the back of the bed come in contact with the ground. The lowerable trailer is ideal for the transportation of custom vehicles to and from an auto show where the custom vehicles may have limited ground clearance. The pneumatic cushions can be filled with a standard hand pneumatic hand pump or with an air compressor that can be powered by a car battery or an electrical outlet.

18 Claims, 6 Drawing Sheets

LOWERABLE TRAILER

CROSS REFERENCE TO RELATED APPLICATION

This application is a continuation-in-part of applicant's co-pending application Ser. No. 12/796,419 filed Jun. 8, 2010 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention relates to improvements in a trailer. More particularly, the present trailer uses air filled cushions to suspend the bed of a trailer that can be deflated to allow the entire bed frame of the trailer to rest on the ground.

2. Description of Related Art Including Information Disclosed Under 37 CFR 1.97 and 1.98:

When transporting a number of trailerable items such as custom vehicles the ground clearance of the transported vehicle is often limited. Moving a custom vehicle on and off of a trailer can often be difficult and can result in damage to the vehicle if the vehicle scrapes on the ground and this can be expensive to repair. One of the best ways to move these expensive vehicles on and off of a trailer is for the bed of the trailer to lay flat on the ground. This minimizes the required ground clearance and makes it safer to move the vehicle on and off of the trailer. Several products and patents have been issued or pending on trailers where some or all of the bed lowers to make it easier to get a vehicle on or off of the trailer. Exemplary examples of patents covering these products are disclosed herein.

U.S. Pat. No. 5,433,578 issued Jul. 18, 1995 to William Homan Jr., discloses a Retractable Suspension. The retractable suspension moves the leaf springs up into the frame to lower the bed of the trailer. As the suspension is retracted a link pulls the tow arm to lower the front of the trailer. While this patent allows the bed of the trailer to be lowered, the patent requires a complicated linkage of mechanisms.

U.S. Pat. No. 2,230,014 issued to P. H. Raven on Jan. 28, 1941 and U.S. Pat. No. 5,536,131 issued Jul. 16, 1996 to Albert Behr both disclose trailers where the bed of the trailer is attached to a pair of parallel arms that swing an inner bed down to the ground. The inner bed is raised and lowered by either a cable or a pressurized cylinder. Both of these patents use a single axle of wheels and require two sets of frames that add complexity and the cost of making the trailer.

U.S. Pat. No. 5,308,213 issued May 3, 1994 to Gerald M. Gilbertson, U.S. Pat. No. 5,474,416 issued Dec. 12, 1995 to Michael E. Rogge et al and U.S. Pat. No. 5,810,544 issued Sep. 22, 1998 to Phillip Wellman all disclose a trailer with a separate bed that is raised and lowered with a cable system. The cable system must be strong enough to lift not only the internal bed but must also be strong enough to lift anything that is loaded onto the movable bed. While these patents allow for ground level loading onto the trailer the trailer requires a complex cable elevating system and limited cushioning to anything placed onto the transportation platform.

What is needed is a trailer where the bed of the trailer can be easily raised and lowered. The ideal trailer would provide cushioning to the load in the trailer. Using one or more bladders to provide both the elevation and the cushioning will provide an improved ride and the inflatable bladders can be raised with a plug in air compressor that is commonly available and used when transporting a vehicle on the trailer.

BRIEF SUMMARY OF THE INVENTION

It is an object of the lowerable trailer to have a pneumatic suspension system. The pneumatic suspension system allows the amount of cushioning to be adjusted based upon the weight of the load as well as the amount of desired cushion. A pneumatic suspension system can also be easily modified to raise or lower the transportation height of the material within the bed to increase ground clearance. The height of the pneumatic suspension can also be adjusted to match the height of the hitch on the tow vehicle.

It is an object of the lowerable trailer to include a pneumatic lift that can change the elevation of the bed from ground level to transportation height. This adjustment can place the bed at the lowest minimum height to allow vehicles of very low ground clearance to be rolled or driven onto the bed with limited fear that the front or back of the transported vehicle will scrape the ground or the integrated ramp of the trailer or other cargo equipment and cause potential harm to the vehicle that is being transported on the trailer.

It is another object of the lowerable trailer to include a pneumatically adjustable tongue. The ability to change the angle of the tongue to the hitch and the bed is important to ensure that the transportation bed is flat or level with the ground. Using a pneumatic adjustment for the tongue allows for both a cushioned connection from the tongue to rotate relative to the bed to reduce motion that is transferred from the tow vehicle to the trailer.

It is another object of the lowerable trailer to have a level deck. The pneumatic cushioning system allows for one pair or multiple pairs of tires to be used and the pressure of each pneumatic pillow can be adjusted either together or independently to change the angle of the bed as well as account for the location where the load is placed onto the bed.

It is still another object of the lowerable trailer to use air or other pressurized gas to adjust the pressure in the pneumatic cushions. The use of pneumatic pressure is ideal because at car shows and other motorsports events the use of small and or large air compressors or other compressed air or gas sources is readily available to fill the tires of vehicles. To fill the pneumatic cushion the user just needs a manual pump that can be attached to a standard tire valve located on the cushion.

Various objects, features, aspects, and advantages of the present invention will become more apparent from the following detailed description of preferred embodiments of the invention, along with the accompanying drawings in which like numerals represent like components.

DETAILED DESCRIPTION OF THE INVENTION

Figure 1:
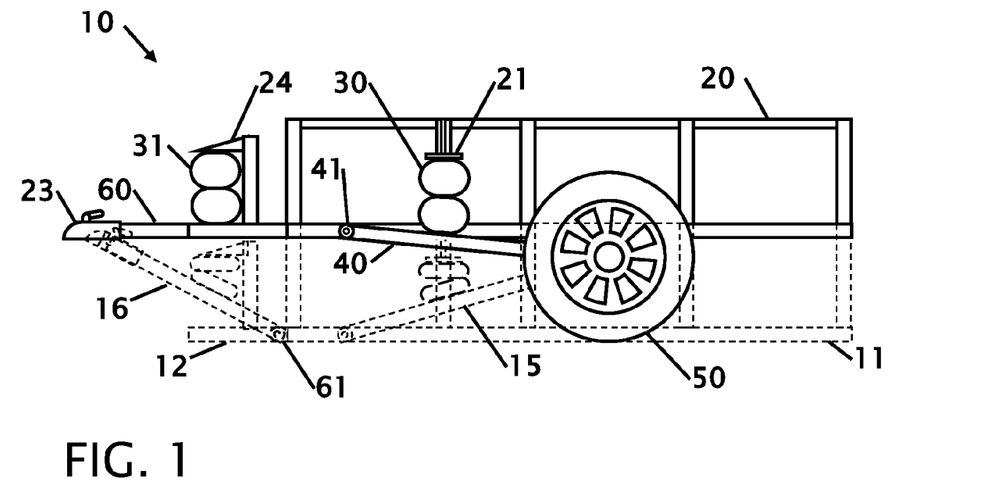
FIG. 1 shows a side view of a two wheel lowerable trailer showing the frame in a raised orientation and in a phantom lowered orientation for a first preferred embodiment.
Figure 2:
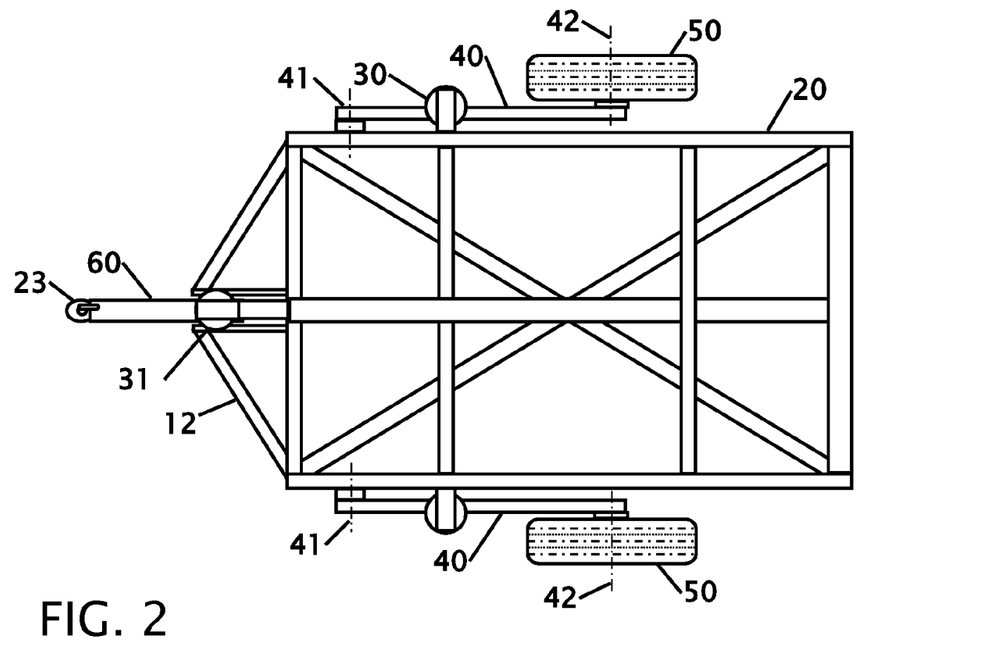
FIG. 2 shows a top view of the two wheeled lowerable trailer from FIG. 1.

FIG. 1 shows a side view of a two wheel lowerable trailer showing the frame in a raised orientation and in a phantom lowered orientation for a first preferred embodiment, and FIG. 2 shows a top view of the two wheeled lowerable trailer from FIG. 1. From FIG. 1 the trailer 10 is shown with solid lines and in phantom dashed lines with the frame lowered 11. It should be clear from this figure that when the frame 20 is lowered both the front and back of the fame bed is placed in full contact with the ground. This provides the lowest ground clearance for installing and removing items from the bed of the trailer. The phantom dash lines show the wheel raised 15 and the tongue raised 16.

The tongue of the trailer pivots separately from the bed to allow the trailer to remain in contact with the tow vehicle to thereby reducing the amount of time and effort that is required to unhitch and re-hitch the hitch socket onto the tow vehicle from the hitch socket 23. From these figures the frame 20 is shown constructed from tubular members. The frame 20 is elevated around the bed of the trailer 10. While the configuration shown is for an outer frame 20 that is between about one and two feet tall, it is contemplated that no railing or a lowered railing as well as high and complete side walls can be used with the trailer sides. The railing 20 provides some structural rigidity to the trailer 10.

In the front of the trailer the tongue 60 pivots on the frame tongue extension 12 at tongue pivot axis 61. One or more bladders 21 are supported at one end on tongue pneumatic bladder support 31 that is rigidly connected to the frame 20 of the trailer 10 with the tongue pneumatic support 24. In the embodiment shown two pneumatic bladders 31 are shown stacked in series to provide greater extension, but as few as one to more than two bladders are contemplated. While the bladders are shown stacked in series, it is also contemplated that multiple bladders can be connected in parallel to increase the lifting force. The connection of the tongue to the trailer is shown and described in more detail with FIG. 5 herein.

The wheel(s) 50 are mounted on a suspension arm 40 that pivots 41 to raise and lower the bed and frame 20 of the trailer 10. The wheel(s) 50 independently spin on wheel spin axis 42. Because the wheels are mounted on the outside of the trailer frame 20 they move independent of the frame and the frame 20 can be made as a single structural unit whereby allowing the trailer 10 to support a greater load. The suspension arm pivots on the frame 20 through pivot point 41 and one or more pneumatic bladders 30 provide both a cushioned suspension and the ability to raise and lower the bed/frame 20 of the trailer. The pneumatic bladders 30 are secured to the frame 20 at a wheel pneumatic bladder support 21 that is rigidly secured to the frame 20. The connection of the suspension arm 40 to the trailer is shown and described in more detail with FIG. 6 herein.

Figure 3:
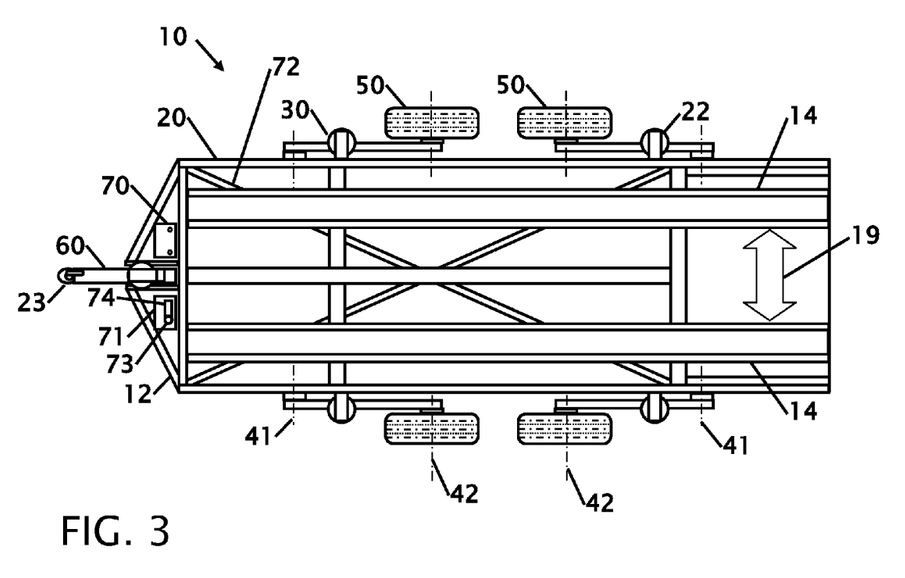
FIG. 3 shows top view of the four wheeled lowerable trailer from a second preferred embodiment.
Figure 4:
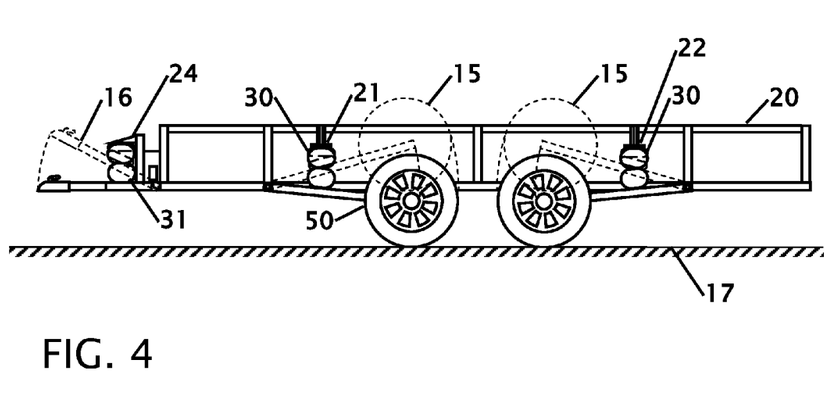
FIG. 4 shows a side view of the four wheeled lowerable trailer from FIG. 3 with the retracted wheels and tongue shown in phantom.

FIG. 3 shows top view of the four wheeled lowerable trailer from a second preferred embodiment and FIG. 4 shows a side view of the four wheeled lowerable trailer from FIG. 3 with the retracted wheels and tongue shown in phantom. From FIG. 4 the trailer 10 is shown with solid lines with the wheels 50 on the ground 17 and in phantom dashed lines with the wheels 15 and the tongue 16 lifted into the frame 20. It should be clear from this figure that when the frame 20 is lowered both the front and back of the fame bed is placed in full contact with the ground. This provides the lowest ground clearance for installing and removing items from the bed of the trailer. Also the deck can be covered with a solid surface to allow transportation of granular material such as sand or gravel.

The tongue of the trailer pivots separately from the bed to allow the trailer to remain in contact with the tow vehicle to thereby reducing the amount of time and effort that is required to unhitch and re-hitch the hitch socket onto the tow vehicle from the hitch socket 23. From these figures the frame 20 is shown constructed from tubular members. The frame 20 is elevated around the bed of the trailer 10. While the configuration shown is for an outer frame 20 that is between about one and two feet tall, it is contemplated that no railing or a lowered railing as well as high and complete side walls can be used with the trailer sides. The railing 20 provides some structural rigidity to the trailer 10. FIG. 3 shows that the bed of the trailer is configured with car ramps 14 that help to maintain a car or other wheeled vehicle positioned within the bed of the trailer 10. In the preferred embodiment the distance between the car ramps 19, from FIG. 3, are adjustable to accommodate different width wheel basses of the vehicles that will be transported on the trailer 10. The frame 10 can be fabricated with anchor tie downs 72 to secure items onto the bed of the trailer 10.

In the front of the trailer the tongue 60 pivots on the frame tongue extension 12 at tongue pivot axis 61. One or more bladders 31 are supported at one end on tongue pneumatic bladder support 31 that is rigidly connected to the frame 20 of the trailer 10 with the tongue pneumatic support 24. In the embodiment shown two pneumatic bladders 31 are shown stacked in series to provide greater extension, but as few as one to more than two bladders are contemplated. While the bladders are shown stacked in series, it is also contemplated that multiple bladders can be connected in parallel to increase the lifting force. The connection of the tongue to the trailer is shown and described in more detail with FIG. 5 herein.

The wheel(s) 50 are mounted on a suspension arm 40 that pivots 41 to raise and lower the bed and frame 20 of the trailer 10. The wheel(s) 50 independently spin on wheel spin axis 42. Because the wheels are mounted on the outside of the trailer frame 20 they move independent of the frame and the frame 20 can be made as a single structural unit whereby allowing the trailer 10 to support a greater load. The suspension arm pivots on the frame 20 through pivot point 41 and one or more pneumatic bladders 30 provide both a cushioned suspension and the ability to raise and lower the bed/frame 20 of the trailer. The pneumatic bladders 30 are secured to the frame 20 at a wheel pneumatic bladder support 21/22 that is rigidly secured to the frame 20. The connection of the suspension arm 40 to the trailer is shown and described in more detail with FIG. 6 herein.

While FIGS. 3 and 4 show two axles of wheels, for a total of four wheels, it is contemplated that additional wheel axis can be added to further increase the load carrying capacity of the trailer 10. The pneumatic bladders 30 can be pneumatically connected together or independently. With the pneumatic bladders 30 are connected together, they can all be filled from the same connection or air supply. If the pneumatic bladders 30 are independent the amount of cushion can be adjusted to balance the load as well as alter the amount of load on the tongue or hitch socket 23.

In FIGS. 3 and 4 the front of the trailer is shown with a battery 70 and an air compressor 71 a pressure gauge 73 and or a connection for connecting an external air supply. The pneumatic bladders have one or more air relief valves 74 to vent air within the pneumatic bladders to lower the trailer frame. The inclusion of these two components allows the trailer to be self-contained whereby the trailer can fill or maintain the pressure in the pneumatic bladders. The height of the trailer bed can be altered by changing the amount of air pressure within each pneumatic suspension bladder(s) 30. It is contemplated that a series of hoses connect the pneumatic bladders and that the hoses are attached externally to the frame or are passed through the frame to provide protection to the hoses.

Figure 5:
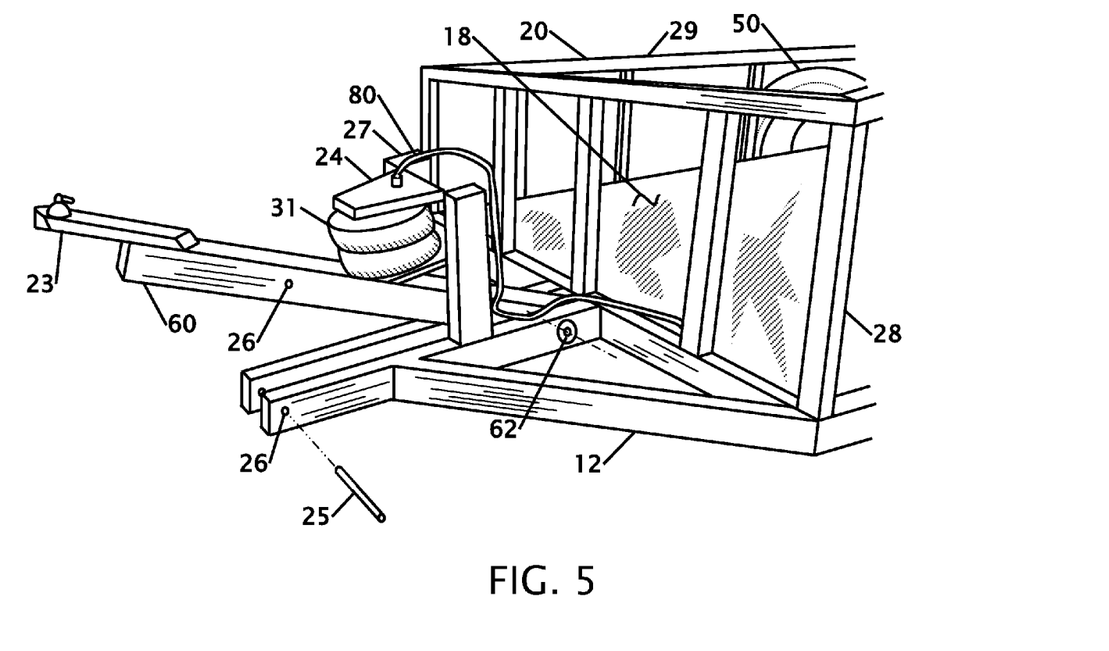
FIG. 5 shows a detailed perspective view of the pivoting tongue.

FIG. 5 shows a detailed perspective view of the pivoting tongue. The frame 20 has a frame tongue extension 12 that provides a forked extension where the pivoting tongue 60 is supported between the forks. When the pneumatic bladder 31 is filled, the tongue 60 will rotate into a horizontal orientation and a locking pin 25 is passed through a series of holes 26 that are located in both the frame tongue extension and the pivoting tongue 60 the pin locks the tongue and prevents rotation of the pivoting tongue 60. The pivoting tongue 60 terminates at one end with a hitch socket 23 and at the other end at a pivotal axis 62 where it is secured to the frame 20. are secured to the pivoting tongue with a pivoting connector, and are secured to the frame of the trailer with a tongue pneumatic bladder support 24 that is welded to risers 27 that are welded to the frame 20.

The trailer in this figure is configured with a flat deck 18 with a series of uprights 28 that are secured or welded to create the frame 20 with a top railing 29. A portion of one of the tires 50 is visible in this figure. This figure shows a filling hose 80, but it is also contemplated that the pneumatic bladders can be filled without an attached hose by connecting an air filling line.

Figure 6:
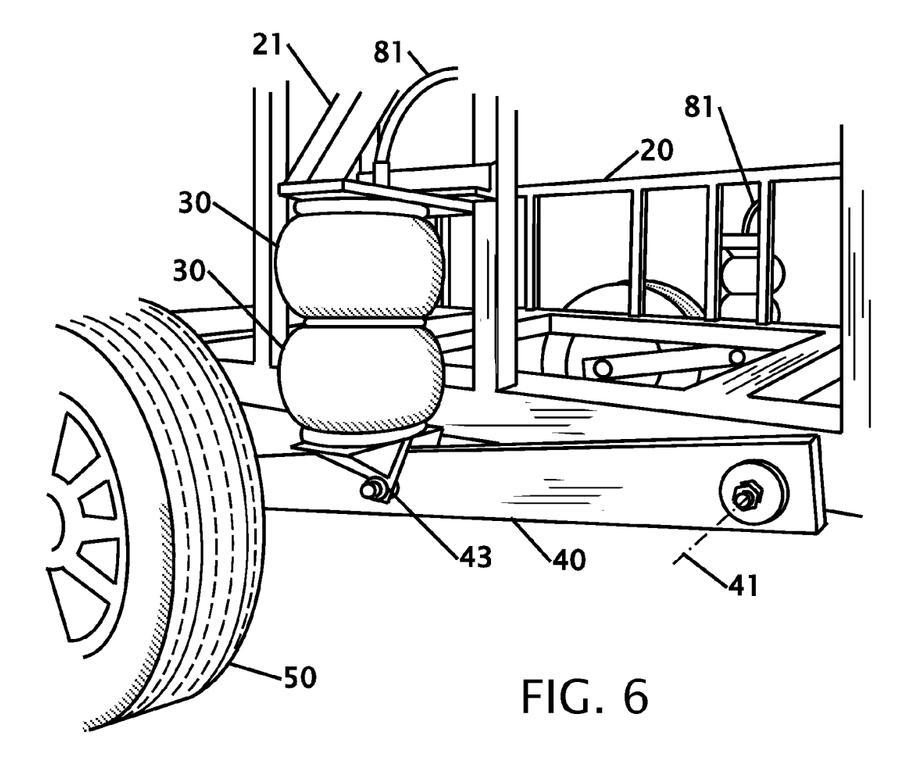
FIG. 6 shows a detailed perspective view of a pivoting wheel.

FIG. 6 shows a detailed perspective view of a pivoting wheel. The wheel(s) 50 are mounted on a suspension arm 40 that pivots 41 to raise and lower the bed and frame 20 of the trailer. Because the wheels are mounted on the outside of the trailer frame 20 they move independent of the frame 20. The suspension arm pivots on the frame 20 through pivot point 41 and one or more pneumatic bladders 30 provide both a cushioned suspension and the ability to raise and lower the bed/frame 20 of the trailer. The pneumatic bladders 30 are secured to the frame 20 at a wheel pneumatic bladder support 21 that is rigidly secured to the frame 20. A pivot 43 allows the pneumatic bladder(s) to rotate on the suspension arm 40 to allow the pneumatic bladders to compress and expand on their parallel faces. Filling hoses 81 connect wheel groups on both sides of the trailer frame 20.

Figure 7:
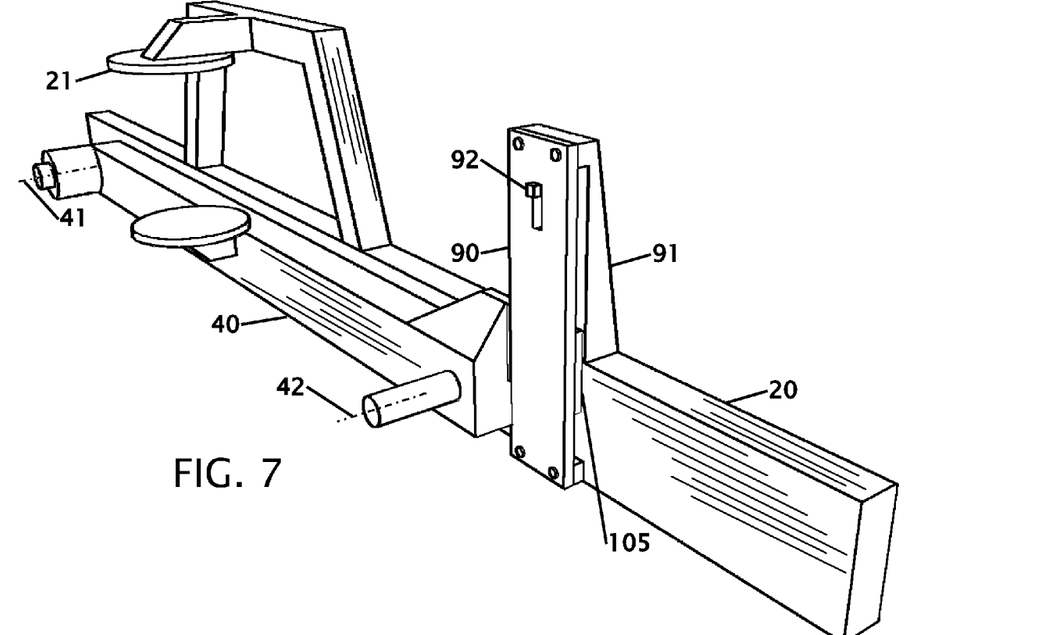
FIG. 7 shows a perspective view of one side rail with a sway prevention device with a safety stop device.
Figure 8:
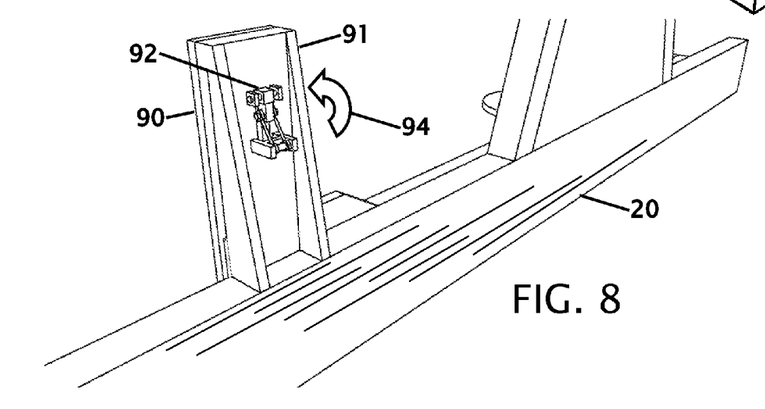
FIG. 8 shows the opposite side view of the safety stop device from FIG. 7.

FIG. 7 shows a perspective view of one side rail with a sway prevention device with a safety stop device and FIG. 8 shows the opposite side view of the safety stop device from FIG. 7. In the event that some component of the pneumatic circuit where to fail, especially on a "single axle" 42 version of the lowerable trailer as currently designed, there would be nothing to prevent the trailer deck from traveling all the way to the ground. Therefore, to prevent this from happening, a mechanical means is incorporated to ensure that in such an event, the pivoting arm 40 will not be able to travel up in its full range of motion, thereby preventing the deck from making contact with the ground. Each pivoting arm 40 having one wheel axle 42 mounted to it will have one of these devices so that each arm 40 will be prevented from traveling into its full range of motion. In this embodiment the stop 92 will retract into the "lowering" position when force is applied to the stop 92 by either pressurized air or other mechanical means, and that it will return to its "safe" position when that force is removed. In this embodiment the stop(s) 92 may be actuated into the "lowering" position at once, or that each stop 92 can be actuated independently of the others.

The stop(s) 92 can be moved into the "lowering" position by some means of applying force by either pressurized air, or other mechanical means such as a cable connected to the stops via a pulley system. The stop 92 is spring loaded so as to be in the "travel" or "safe" position at all times, and can only be moved if force is deliberately applied to the stop(s) 92 to cause the stop(s) 92 to move 94 into the "lowering" position. The stop is intended to halt the vertical motion of the pivoting arm in the event of a pneumatic circuit failure. This device can be secured to the frame rail portion 20 of a track guide system 90 and 91, on the inner side 90. If mounted to the frame 20 portion of the track guide system, the stop 92 will protrude through both the inner 90 and outer most 91 vertical components of the track through slots cut into them, and will be directly above the pivoting arm 40 portion of the track guide system 90 and 91 at all times until force is applied to the device by the user causing the stop 92 to swing 94 back behind the inner most portion 90 of the track guide system. A bar made of steel, aluminum, or some other material with high impact strength, will be pivotally mounted to the inner portion 90 of the frame rail portion of the track guide system.

The bar stop 92 will be spring loaded so as to cause it to be in the 'travel' position at all times (travel position being that the bar protrudes through both the inner and outer components of the frame rail track guide system), until force is applied to the bar that will cause it to swing into the "lowering" position. All travel stops, each wheel having one, can be connected on one air circuit, to allow the stops to be actuated into the "lowering" position at the same time. When the pneumatic circuit is charged with pressurized air, pneumatic force is applied to the stop 92 by a small pneumatic spring or similar device that will move the stop(s) 92 into their "lowering" position.

Figure 9:
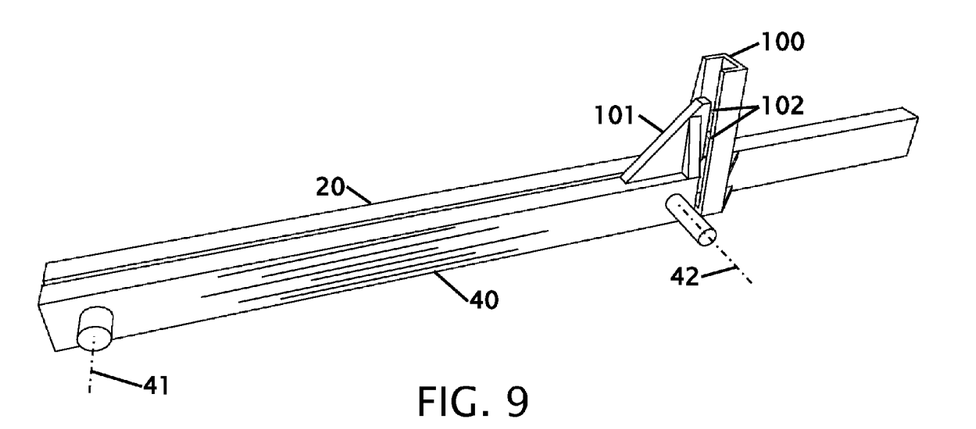
FIG. 9 shows a perspective view of an alternate embodiment of the sway prevention device.
Figure 10:
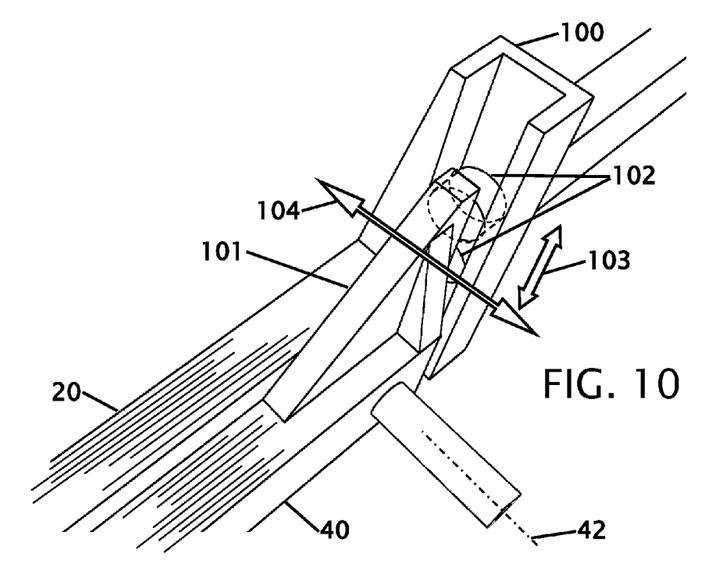
FIG. 10 shows a close-up view of the sway prevention device from FIG. 9.

FIG. 9 shows a perspective view of an alternate embodiment of the sway prevention device and FIG. 10 shows a close-up view of the sway prevention device from FIG. 9. The purpose of the track guide system is to eliminate unwanted movement along the length of the arm 40 from pivot point 41 to wheel center 42. By confining the pivoting end of the arm 40 to the outer frame 20 member, it effectively limits the pivoting arm 40 to vertical 103 movement only, relative to the trailer's deck. Thereby eliminating camber changes and toe-in/toe-out movements 104 that might be experienced when the trailer is in motion. Example: when the trailer takes a corner the deck, having a load, will cause the wheels, being in contact with the ground, to change camber, which is undesirable in that it will cause excess fatigue at the pivot 41 point and to the pivoting arm 40 and will contribute to poor handling. The same members will experience this fatigue if the toe changes while cornering or driving on rough roads as side loads are applied at the wheel. Confining the pivoting arm(s) 40 to vertical only 103 movement will decrease body roll that the trailer deck experiences. This effect would be desirable in that all the structural components of the trailer will experience less fatigue, and handling will be greatly improved.

The track guide will need be at the wheel-end of the arm 40 to confine the movement at that end. Therefore, the whole of the apparatus cannot exceed the distance between the inside surface of the tire and the outer surface of the frame rail. It is important that the system allow for some top-out movement while limiting wheel travel to protect the air spring from over extension. It is also important for the arm to be able to travel all the way up relative to the frame rail to allow for the trailer deck to sit flat on the ground as is the trailers intended purposes. Therefore the pivoting arm 40 will have either a roller 102 or a series of rollers, or a flat plat 105 attached to the rearward most end of the wheel end of the arm 40, that will be confined between either a channel 100 acting as a track, or sandwiched between two plates 90 and 91, acting as a track that will be attached either by welding or bolting to the outer most surface of the frame rail 20. The track will be made out of welded or bolted steel or aluminum members 101 and that the outer most component of the track 100 or 90 will be removable so that a replaceable wear surfaces made of steel, aluminum, nylon, acetyl or some other material, which is intended to prevent the permanent members of the track 90, 91 or 100 from being worn or damaged, can be replaced and or serviced with ease. component of the system can be adjusted so as to allow the user to adjust camber and toe if so desired or needed. This adjustment can be performed by replacing the rollers 102 with different diameter rollers. This can be done by attaching the pivoting arm 40 component of the guide system to the rear end of the pivoting arm 40, via a flange which can be secured through slotted holes, to the pivoting arm 40, thereby allowing lateral 104 and vertical 103 adjustment of the guide component 100. No component of the track guide system can protrude below the bottom most surface of the deck, as this will prevent the trailers deck from sitting flat on the ground.

Thus, specific embodiments of a lowerable trailer have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A lowerable trailer comprising:
    a trailer frame;
    at least one set of tires that are rotationally connected to said trailer frame with an arm on each tire;
    at least one pneumatic bladder connected between each of said arms and said trailer frame to raise and lower said trailer frame;
    each of said arms is pivotally connected to said trailer frame whereby said trailer frame is supported by said at least one pneumatic bladder on each of said arms;
    a tongue that is pivotally connected to said trailer frame;
    a tongue pneumatic bladder that is positioned to adjust an angle between said tongue and said trailer frame whereby said tongue pneumatic bladder allows said tongue to pivot said tongue on said trailer frame at an angle between a hitch and said trailer frame;
    said at least one pneumatic bladder and said tongue pneumatic bladder are connected in series, whereby
    said at least one pneumatic bladder and said tongue pneumatic bladder can be vented to allow said trailer frame to rest on a ground level for a loading/unloading position and filled to elevate said trailer to a transportation position;
    a locking pin that secures said tongue to said frame whereby preventing said tongue pneumatic bladder from providing support between said frame and said tongue, and
    an anti-sway mechanism that minimizes torque on said arms when said lowerable trailer is cornering.

2. The lowerable trailer according to claim 1 wherein each of said at least one pneumatic bladder connected between each of said arms and said trailer is connected to a common filling hose.

3. The lowerable trailer according to claim 1 that further includes car wheel ramps or a dovetail type ramp that is incorporated into a rear of the trailer's frame.

4. The lowerable trailer according to claim 1 wherein said frame further includes raised side members.

5. The lowerable trailer according to claim 1 wherein said tires pivot external of said frame.

6. The lowerable trailer according to claim 1 wherein said pneumatic bladders are adjustable to alter a load carrying capability of said trailer or an elevated height of said trailer frame.

7. A lowerable trailer comprising:
    a trailer frame;
    at least one set of tires that are rotationally connected to said trailer frame with an arm on each tire;
    at least one pneumatic bladder connected between each of said arms and said trailer frame to raise and lower said trailer frame;
    each of said arms is pivotally connected to said trailer frame whereby said trailer frame is supported by said at least one pneumatic bladder on each of said arms;
    a tongue that is pivotally connected to said trailer frame;
    a tongue pneumatic bladder that is positioned to adjust an angle between said tongue and said trailer frame whereby said tongue pneumatic bladder allows said tongue to pivot said tongue on said trailer frame at an angle between a hitch and said trailer frame;
    whereby said at least one pneumatic bladder and said tongue pneumatic bladder can be vented to allow said trailer frame to rest on a ground level for a loading/unloading position and filled to elevate said trailer to a transportation position;
    further includes a travel stop, and
    further includes a locking pin that secures said tongue to said frame whereby preventing said tongue pneumatic bladder from providing support between said frame and said tongue.

8. The lowerable trailer according to claim 7 wherein travel stop is controlled by pneumatic pressure within at least one of said pneumatic bladders.

9. The lowerable trailer according to claim 7 wherein said travel stop is activated when a pressure within at least one said pneumatic bladder falls below a pressure threshold.

10. The lowerable trailer according to claim 7 wherein said travel stop is de-activated when a pressure within at least one said pneumatic bladder increases above a pressure threshold.

11. The lowerable trailer according to claim 7 wherein when a pressure controlled travel stop is activated it prevents said at least one arm from traveling up in its full range of motion.

12. The lowerable trailer according to claim 7 that further includes an anti-sway mechanism.

13. A lowerable trailer comprising:
    a trailer frame;
    at least one set of tires that are rotationally connected to said trailer frame with an arm on each tire;

at least one pneumatic bladder connected between each of said arms and said trailer frame to raise and lower said trailer frame;

each of said arms is pivotally connected to said trailer frame whereby said trailer frame is supported by said at least one pneumatic bladder on each of said arms;

a tongue that is pivotally connected to said trailer frame;

a tongue pneumatic bladder that is positioned to adjust an angle between said tongue and said trailer frame whereby said tongue pneumatic bladder allows said tongue to pivot said tongue on said trailer frame at an angle between a hitch and said trailer frame;

whereby said at least one pneumatic bladder and said tongue pneumatic bladder can be vented to allow said trailer frame to rest on a ground level for a loading/unloading position and filled to elevate said trailer to a transportation position, and further includes anti-sway mechanism wherein said anti-sway mechanism is at least one roller within a guide track.

14. The lowerable trailer according to claim 13 wherein said anti-sway mechanism is located on a free end of said arms.

15. The lowerable trailer according to claim 13 wherein said anti-sway mechanism is adjustable for sway to provide tracking of said lowerable trailer when said trailer is pulled around a corner.

16. The lowerable trailer according to claim 13 wherein said anti-sway mechanism includes at least two guides within a channel to reduce both caster and camber of said arms.

17. The lowerable trailer according to claim 13 that further includes a locking pin that secures said tongue to said frame whereby preventing said tongue pneumatic bladder from providing support between said frame and said tongue.

18. The lowerable trailer according to claim 13 that further includes a pneumatically controlled travel stop.

* * * * *